(12) United States Patent
Bastian et al.

(10) Patent No.: US 10,639,878 B2
(45) Date of Patent: May 5, 2020

(54) THREE-DIMENSIONAL PRINTING

(71) Applicant: Autodesk, Inc., San Rafael, CA (US)

(72) Inventors: Andreas Linas Bastian, Berkeley, CA (US); Gregory David Meess, Berkeley, CA (US)

(73) Assignee: Autodesk, Inc., San Rafael, CA (US)

( * ) Notice: Subject to any disclaimer, the term of this patent is extended or adjusted under 35 U.S.C. 154(b) by 312 days.

(21) Appl. No.: 15/433,213

(22) Filed: Feb. 15, 2017

(65) Prior Publication Data

US 2018/0229448 A1 Aug. 16, 2018

(51) Int. Cl.
| | |
|---|---|
| *B33Y 50/02* | (2015.01) |
| *B33Y 10/00* | (2015.01) |
| *B29C 64/106* | (2017.01) |
| *B29C 64/40* | (2017.01) |
| *B29C 64/393* | (2017.01) |
| *B33Y 30/00* | (2015.01) |

(52) U.S. Cl.
CPC ............ *B33Y 50/02* (2014.12); *B29C 64/106* (2017.08); *B29C 64/393* (2017.08); *B29C 64/40* (2017.08); *B33Y 10/00* (2014.12); *B33Y 30/00* (2014.12)

(58) Field of Classification Search
CPC ......... B33Y 50/02; B33Y 10/00; B33Y 30/00; B29C 64/393; B29C 64/40; B29C 64/106
See application file for complete search history.

(56) References Cited

U.S. PATENT DOCUMENTS

| | | | | |
|---|---|---|---|---|
| 2016/0144574 A1* | 5/2016 | Eilken | ..................... | G06T 19/20 264/129 |
| 2016/0200051 A1* | 7/2016 | Urbanic | .................. | B29C 64/40 264/308 |

OTHER PUBLICATIONS

Unknown Author, "Isogrid—Wikipedia, the free encyclopedia," (Aug. 18, 2016) [online] (retrieved from https://en.wikipedia.org/wiki/Isogrid), 3 pages.
Unknown Author, "Slic3r G-code Generator for 3D Printers," (Jul. 20, 2016) [online] (retrieved from http://slic3r.org/releases/1.2.0), 6 pages.
Unknown Author, "Feature Request: 3D Honeycomb Infill #1646," (Jul. 20, 2016) [online] (retrieved from https://github.com/alexrj/Slic3r/issues/1646), 36 pages.
Jin et al., "Optimization of Process Planning for Reducing Material Consumption in Additive Manufacturing," Journal of Manufacturing Systems, 2017, 44:65-78.
Liu et al., "Current and Future Trends in Topology Optimization for Additive Manufacturing," Structural and Multidisciplinary Optimization, May 2018, published online at https://doi.org/10.1007/s00158-018-1994-3, 28 pages.

(Continued)

*Primary Examiner* — Kelly M Gambetta
(74) *Attorney, Agent, or Firm* — Fish & Richardson P.C.

(57) ABSTRACT

Methods, systems, and apparatus, including computer programs encoded on computer storage media, for working with three-dimensional object models for printing. One of the methods includes determining a plurality of infill structures in a slice of an object; and determining a path for the tool-head to create the plurality of infill structures including: determining a first portion of the path for deposition of a first infill structure during a first time period; determining a second portion of the path for deposition of one or more second infill structures that are not adjacent to the first infill structure during a second time period; and determining a third portion of the path for deposition of a third infill structure that is adjacent to the first infill structure, wherein the second time period is determined to allow the first infill structure to cool before deposition of the third infill structure.

11 Claims, 7 Drawing Sheets

(56) References Cited

OTHER PUBLICATIONS

Lu et al., "Build-to-Last: Strength to Weight 3D Printed Objects," ACM Transactions on Graphics (TOG) TOG Homepage, vol. 33, Issue 4, Jul. 2014, Article No. 97, New York, NY, Article No. 97, 10 pages.

Wang et al., "Support-free Hollowing," IEEE Transactions on Visualization and Computer Graphics, Oct. 2018, 24(10):2787-2798.

Wu et al., "Infill Optimization for Additive Manufacturing—Approaching Bone-like Porous Structures," (Nov. 19, 2016) [online] (retrieved from https://arxiv.org/abs/1608.04366v2), 14 pages.

* cited by examiner

THREE-DIMENSIONAL PRINTING

BACKGROUND

Three-dimensional (3D) printing manufacturing systems may enable companies to manufacture products on-demand (sometimes after receiving payment for the product), reduce or eliminate tooling costs, launch new products rapidly, have faster product evolution, reduce product inventory, introduce supply chain simplification and savings, have design and assembly simplification via reduced part count, perform manufacturing locally, reduce shipping and waste, and increase local recycling and material re-use.

SUMMARY

In some implementations, a three-dimensional modelling system can analyze a three-dimensional model of a solid object that will be created by a three-dimensional extrusion printer to determine whether and where to add internal supports in the model so that when the object is created the internal supports will support hollow shell inside the object so that a printer does not have to create a solid object, e.g., to reduce the material, print time, or both, for the object. The three-dimensional modelling system adds data for the hollow shell and the internal supports to the three-dimensional model so that the three-dimensional extrusion printer will only generate infill in the object where it is needed instead of for an entire volume of the object. For instance, the three-dimensional modelling system can determine whether a region of the hollow shell has an interior surface slope that does not satisfy a threshold angle, e.g., is greater than the threshold angle, and does not need an internal support to support the hollow shell during printing of the object, when the object is in use, or both. When the three-dimensional modelling system determines that the interior surface slope satisfies the threshold angle, the three-dimensional modelling system adds an interior support for the corresponding interior surface. The three-dimensional modelling system can use properties of the object, the three-dimensional extrusion printer, or both, to determine the threshold angle.

In some implementations, a three-dimensional modelling system can determine a print path for a tool-head in a three-dimensional extrusion printer that has time and space separated depositions for sequential material cooling. The three-dimensional modelling system can determine a print path that skips between non-adjacent cells or infill structures to allow a recently deposited fill line to cool before deposition of a neighboring fill line that is adjacent to the recently deposited fill line. In some implementations, the three-dimensional modelling system can use an open cell lattice in which sections of the object contain no toolpaths connecting unit cells. For instance, the open cell lattice can localize contractive forces to individual lattice struts during printing rather than realizing them over the extents of the object.

In general, one innovative aspect of the subject matter described in this specification can be embodied in methods that include the actions of receiving a three-dimensional model of a solid object for creation by a three-dimensional extrusion printer; determining a hollow shell for the three-dimensional model that includes a plurality of interior surfaces; determining, for each of the plurality of interior surfaces, an angle of the respective interior surface; determining, for each of the interior surfaces that have an angle that satisfies a threshold angle, an infill structure for an interior structure to be located inside a modified object and extending through each layer of the three-dimensional model up to the respective interior surface, wherein the modified object is the same type of object as the solid object with at least one aperture; skipping, for each of the interior surfaces that have an angle that does not satisfy the threshold angle, generation of any infill structure; and generating data that represents each of the determined infill structures for use by the three-dimensional extrusion printer with the three-dimensional model to create the modified object. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving a three-dimensional model of an object to be created by a three-dimensional extrusion printer that includes a tool-head that will create at least a portion of the object; determining a plurality of infill structures in a slice of the object, the infill structures including a first infill structure, one or more second infill structures that each are not adjacent to the first infill structure in the slice, and a third infill structure that is adjacent to the first infill structure in the slice; and determining a path for the tool-head to create each of the plurality of infill structures in the slice of the object including: determining a first portion of the path to cause the tool-head to deposit material forming the first infill structure during a first time period; determining a second portion of the path to cause the tool-head to deposit material forming each of the second infill structures that are not adjacent to the first infill structure during a second time period after the first time period; and determining a third portion of the path to cause the tool-head to deposit material forming the third infill structure that is adjacent to the first infill structure during a third time period after the second time period, wherein the second time period is determined to allow the first infill structure to cool before deposition of the third infill structure by the tool-head of the three-dimensional extrusion printer. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Receiving the three-dimensional model of the solid object to be created by the three-dimensional extrusion printer may include receiving the three-dimensional model of the solid object to be created by a fused filament fabrication printer. The method may include comparing, for each of the plurality of interior surfaces of the modified object, the angle of the respective interior surface with the threshold angle; determining, for each interior surface in a first subset of the interior surfaces, that the angle of the respective interior surface satisfies the threshold angle; and determining, for each interior surface in a second subset of the interior surfaces, that the angle of the respective interior surface does not satisfy the threshold angle, the second subset being a different, disjoint subset of the interior surfaces than the first subset. Determining, for each of the interior surfaces that have an angle that satisfies the threshold angle, the infill structure for the interior structure to be located inside the modified object and extending through each layer of the three-dimensional model up to the respective interior surface may include determining, for each of the interior surfaces in the first subset, the infill structure for the interior structure to be located inside the modified object and extending through each layer of the three-dimensional model up to the respective interior surface in response to determining that the angle of the respective interior surface satisfies the threshold angle. Skipping, for each of the interior surfaces that have an angle that does not satisfy the threshold angle, generation of any infill structure may include skipping, for each of the interior surfaces in the second subset, generation of any infill structure in response to determining that the angle of the respective interior surface does not satisfy the threshold angle.

In some implementations, the method may include determining a configuration of the three-dimensional extrusion printer; determining a material that the three-dimensional extrusion printer will use to create the modified object; and determining the threshold angle using the configuration and a property of the material. The method may include determining a material that the three-dimensional extrusion printer will use to create the modified object; and determining the threshold angle using a property of the material. The method may include determining a configuration of the three-dimensional extrusion printer; and determining the threshold angle using the configuration.

In some implementations, the method may include generating a plurality of slices of the three-dimensional model that each identify one or more surfaces for the modified object represented by the respective slice in response to generating data that represents each of the determined infill structures for use by the three-dimensional extrusion printer with the three-dimensional model to create the modified object; generating, for each of the plurality of slices, tool path data that indicates a path for a tool-head included in the three-dimensional extrusion printer to create the one or more surfaces represented by the respective slice; and providing, for at least one of the plurality of slices, the tool path data to the three-dimensional extrusion printer. Receiving the three-dimensional model of the object to be created by the three-dimensional extrusion printer may include receiving the three-dimensional model of the object to be created by a fused filament fabrication printer. The method may include determining a material that the three-dimensional extrusion printer will use to create the object; determining a cooling time for the material using a first temperature at which the material will be deposited and at least one second temperature of an area in which the material will be deposited; and determining a duration for the second time period using the cooling time for the material. The method may include determining a material that the three-dimensional extrusion printer will use to create the object; determining a property of the material; and determining a length of the first portion of the path using the property of the material. The method may include determining a material that the three-dimen-sional extrusion printer will use to create the object; determining a property of the material; and determining a deposition rate for the first portion of the path using the property of the material.

In some implementations, determining the path for the tool-head to create each of the plurality of infill structures may include determining, for all infill structures in the plurality of infill structures for which a portion of the path has not been determined, a respective portion of the path during a period of time separated in time from the time periods for the infill structures adjacent to the respective infill structure to allow the adjacent infill structures to cool before deposition of the respective infill structure. Determining the second portion of the path to cause the tool-head to deposit material forming each of the second infill structures that are not adjacent to the first infill structure during the second time period after the first time period may include determining the second portion of the path to cause the tool-head to deposit material forming each of two or more second infill structures that are not adjacent to the first infill structure during the second time period after the first time period. The method may include generating the slice of the object that identifies one or more surfaces for the object represented by the respective slice; and providing, for the slice of the object, tool path data that indicates the path for the tool-head to create the slice of the object to the three-dimensional extrusion printer.

The subject matter described in this specification can be implemented in particular embodiments and may result in one or more of the following advantages. In some implementations, a modelling system may reduce an amount of material necessary to print an object, reduce an amount of time necessary to print the object, or both, by creating internal supports where needed compared to other systems. In some implementations, a modelling system that generates a tool-head print path which has time and space separated fill line depositions may alleviate internal forces that induce warping in the fill lines while the fill lines cool. In some implementations, a modelling system may use an open cell lattice to localize contractive forces to individual lattice struts during printing, e.g., rather than realizing them over the extents of the object. In some implementations, when a modelling system determines a path that allows a deposited material in a region to cool and potentially contract, the modelling system may reduce a likelihood that the deposited material in a region will pull away from material in an adjacent region while the material in the two regions cool.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
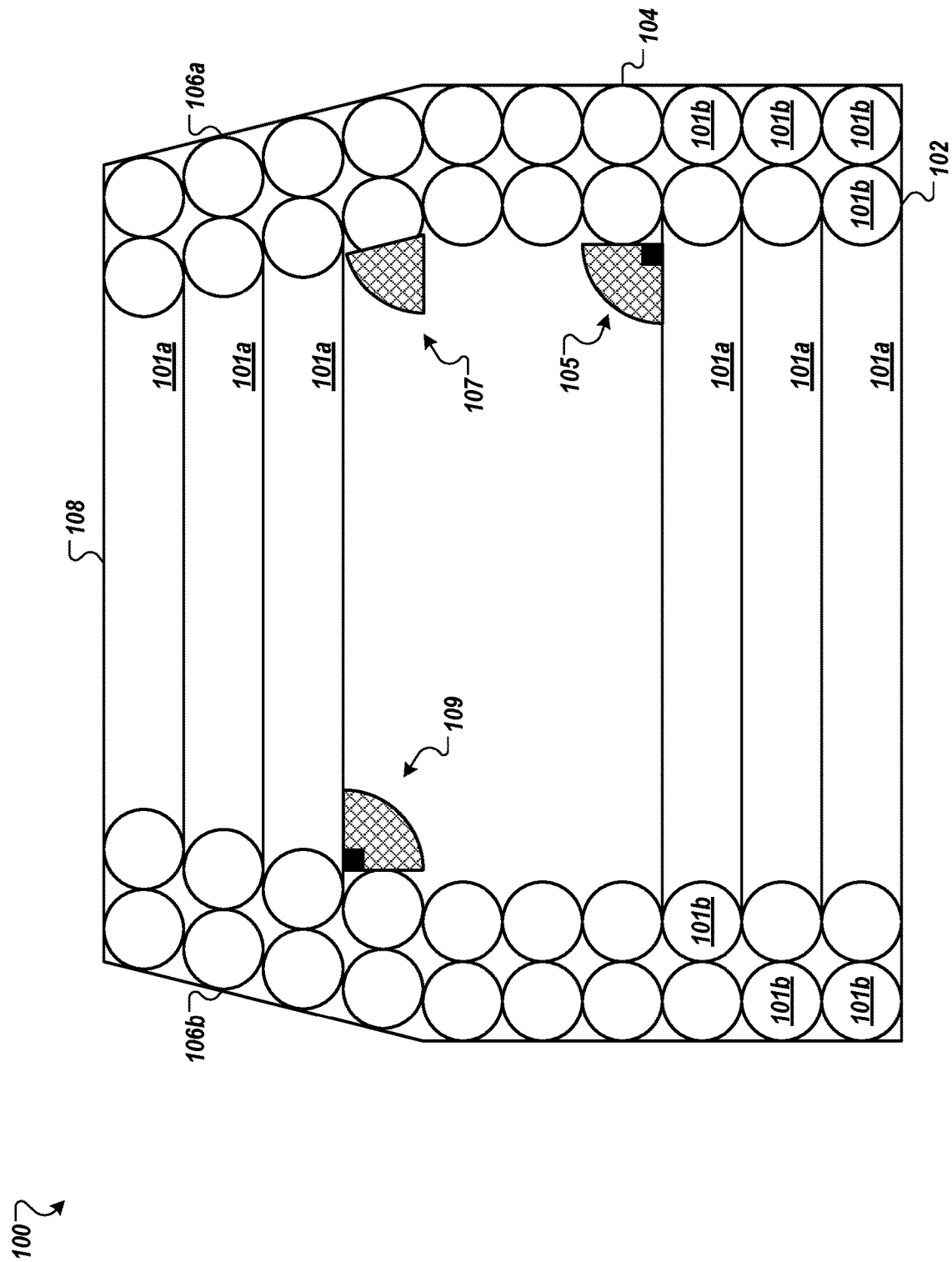
FIGS. 1A-B are an example of a three-dimensional model of an object that can be printed by a three-dimensional extrusion printer.
Figure 1B:
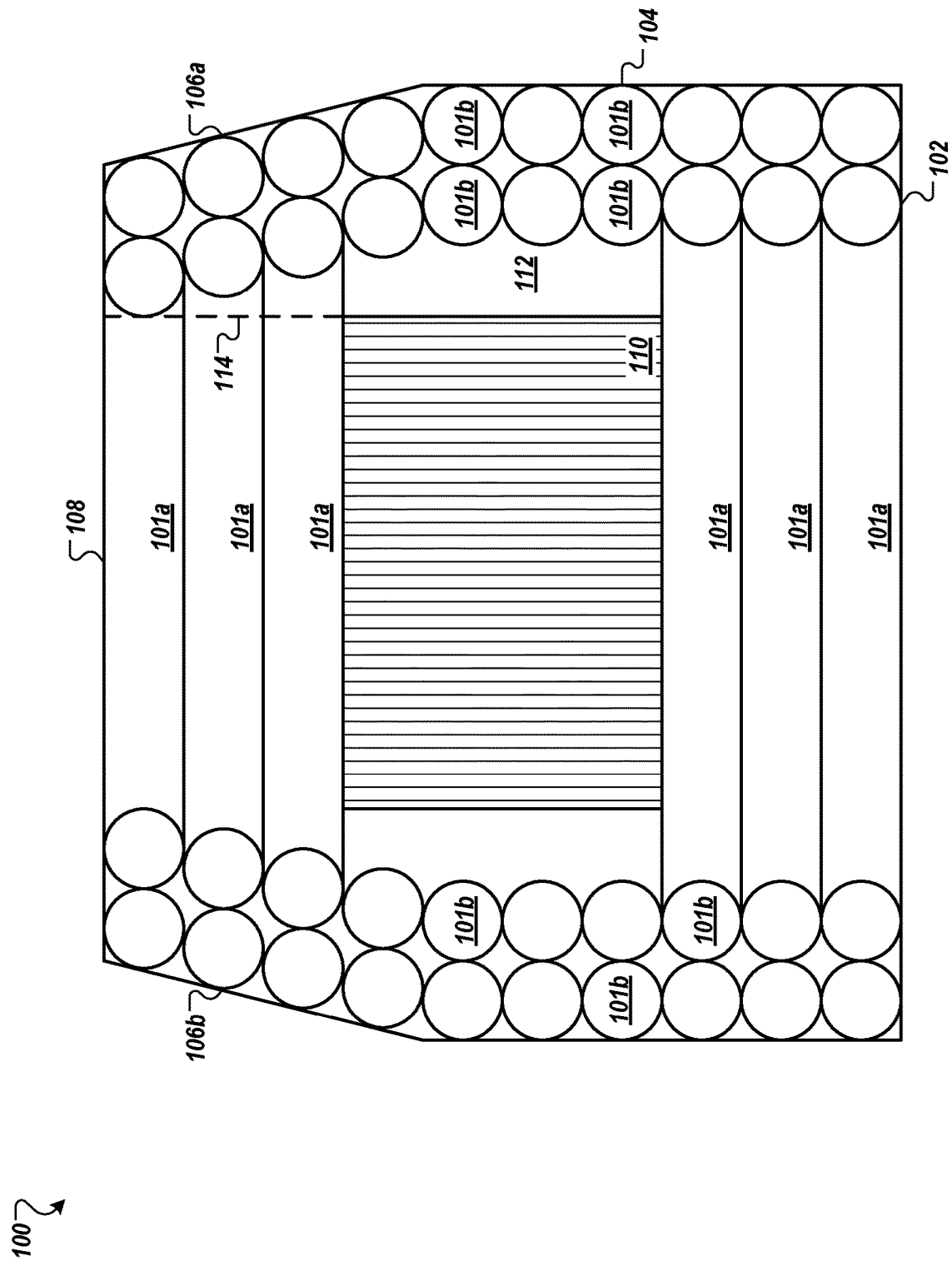

FIGS. 1A-B are an example of a three-dimensional model 100 of an object that can be printed by a three-dimensional extrusion printer. A three-dimensional modelling system may receive the three-dimensional model 100 of a solid object that will be created by a three-dimensional printer and analyze the solid object to determine whether to include any hollow portions within the object, e.g., to reduce material, print time, or both, for the object.

The three-dimensional modelling system may create a hollow shell inside the three-dimensional model 100. For instance, the three-dimensional modelling system may analyze the three-dimensional model to determine whether to print a hollow shell of the object instead of a solid object. The hollow shell can include multiple skins 101a, multiple perimeters 101b, or both, that form an exterior of the object. In FIG. 1A some of the multiple perimeters 101b are labeled. In some examples, all of the circular objects may similarly indicate other perimeters that form the hollow shell.

The three-dimensional modelling system analyze angles of the interior surfaces of the hollow shell to determine whether and where to place an infill structure that will support the interior surface of the hollow shell. The three-dimensional modelling system may compare each interior surface angle of the hollow shell with a threshold angle to determine whether the interior surface angle satisfies the threshold angle, e.g., is less than or equal to the threshold angle or is less than the threshold angle. The surfaces may be polygon meshes that represent the hollow shell or other surfaces for the hollow shell.

The three-dimensional modelling system may generate the hollow shell and analyze the interior surface angles formed by the hollow shell. The three-dimensional modelling system may determine whether the hollow shell, and any interior infill structures that will support part of the hollow shell, provide sufficient support for the object, e.g., whether a strength of a modified object would satisfy a threshold strength for the object. The three-dimensional modelling system may determine the threshold strength using properties of the material that will be used to create the object, expected pressures that may be applied to the object, or another appropriate value. The three-dimensional modelling system may determine whether the hollow shell, and any interior infill structures, satisfy a threshold reduction in material necessary to create a modified object. When the three-dimensional modelling system determines that the hollow shell, and any interior infill structures, do not satisfy a threshold, the three-dimensional modelling system may determine that the entire solid object should be printed and send data for the entire solid object to a printer. When the three-dimensional modelling system determines that the hollow shell, and interior infill structures, satisfy the threshold, the three-dimensional modelling system may send data for the hollow shell and the interior infill structures to a printer, e.g., to cause the printer to create a modified version of the object using the hollow shell and the interior infill structures.

The object may be any appropriate type of object that can be created by a three-dimensional extrusion printer for which the three-dimensional modelling system receives a three-dimensional model of a solid object. For instance, the three-dimensional modelling system may receive a three-dimensional scale model 100 of a block. The block may be a toy with which a child will play. In some examples, the block may be used for construction, e.g., building a house.

As referred to in this document, an exterior surface in a three-dimensional model is a surface that forms an exterior boundary of the three-dimensional model. An interior surface in the three-dimensional model is a surface that is bounded by multiple exterior surfaces of the three-dimensional model, e.g., that is surrounded on all sides by exterior surfaces.

The three-dimensional modelling system may determine an angle of a surface with respect to a three-dimensional extrusion printer print bed on which the object will be created. For example, the three-dimensional modelling system may determine that a bottom 102 of the block will be positioned on the print bed and determines the angles of surfaces with respect to the bottom 102.

The three-dimensional modelling system may analyze each of the walls of the hollow shell, such as a wall 104, to determine whether an angle of the wall satisfies the threshold angle. The wall 104 may include multiple perimeters 101b shown on the right hand side of the three-dimensional model 100. The three-dimensional modelling system may select the wall 104 and determine a particular angle 105 of the wall 104. In the example shown, the three-dimensional modelling system may determine that the particular angle 105 is ninety degrees.

The three-dimensional modelling system compares the particular angle 105 with the threshold angle. For instance, the three-dimensional modelling system may determine a material that will be used to create the wall 104, a configuration of the three-dimensional extrusion printer that will create the block, or both, to determine the threshold angle. The three-dimensional modelling system compares the value for the particular angle 105 with the value for the threshold angle. The three-dimensional modelling system determines that the particular angle 105 of the wall 104 does not satisfy the threshold angle, e.g., that ninety degrees is greater than the threshold angle, and that the three-dimensional modelling system does not need to create an infill structure to support the wall 104.

In some implementations, the three-dimensional modelling system may determine whether to adjust a value for the angle of the surfaces in the three-dimensional model 100, e.g., if the angle is outside a predetermined range of angles. For example, the three-dimensional modelling system may use a predetermined range of angles between zero and ninety degrees, inclusive. The three-dimensional modelling system can determine whether the angle of a surface is between zero and ninety degrees, inclusive. When a value of the angle is not between zero and ninety degrees, inclusive, the three-dimensional modelling system may adjust the value of the angle. For instance, the three-dimensional modelling system may determine an adjusted value for the angle that is between zero and ninety degrees, inclusive, that is the equivalent of the current value of the angle. When the angle is one-hundred eighty degrees, the three-dimensional modelling system may change the value of the angle to zero degrees. When the angle is one-hundred thirty-five degrees, the three-dimensional modelling system may change the value of the angle to forty-five degrees. When the angle is ninety-nine degrees, the three-dimensional modelling system may change the value of the angle to eighty-one degrees.

In some implementations, when the three-dimensional modelling system determines that the angle is between zero and ninety degrees, inclusive, the three-dimensional modelling system compares the angle with the threshold angle to determine whether the angle satisfies the threshold angle. In some examples, the angle may satisfy the threshold angle when the angle is less than the threshold angle. The angle may satisfy the threshold angle when the angle is less than or equal to the threshold angle. When a value of the angle is zero, e.g., when the surface is parallel to the print bed, the three-dimensional modelling system may determine a distance between the surface and the print bed. When the distance is zero, the three-dimensional modelling system determines to skip generation of an infill structure to support the surface. When the distance is greater than zero, the three-dimensional modelling system determines to generate an infill structure to support the surface. When a value of the angle is non-zero and satisfies the threshold angle, the three-dimensional modelling system may generate an infill structure to support the surface. When a value of the angle does not satisfy the threshold angle, the three-dimensional modelling system skips generation of an infill structure to support the surface.

The three-dimensional modelling system may analyze an upper section 106a-b of the hollow shell to determine whether an angle for the upper section 106a-b satisfies a threshold angle. For instance, the three-dimensional modelling system may analyze a first upper section 106a separately from a second upper section 106b when both the first upper section 106a and the second upper section 106b are above the walls 104 of the hollow shell for the block.

The three-dimensional modelling system determines a first angle 107 for the first upper section 106a and compares the first angle 107 with the threshold angle. For instance, the three-dimensional modelling system determines whether the first angle 107 is less than or equal to the threshold angle. In some examples, the three-dimensional modelling system may determine whether the first angle 107 is less than the threshold angle.

The three-dimensional modeling system uses the comparison of the angles to determine whether the first angle 107 satisfies the threshold angle. For example, the three-dimensional modelling system determines that the first angle 107 does not satisfy the threshold angle. In response to determining that the first angle 107 does not satisfy the threshold angle, the three-dimensional modelling system may determine to skip generation of an infill structure that will support the first upper section 106a. For instance, the three-dimensional modelling system determines not to generate an infill structure in the three-dimensional model 100 that will support the first roof upper 106a.

The three-dimensional modelling system may determine that a second angle of the second upper section 106b is the same as the first angle 107 of the first upper section 106a. The three-dimensional modelling system may determine, in response, to skip generation of an infill structure that will support the second upper section 106b. In some examples, the three-dimensional modelling system may compare the second angle of the second upper section 106b with the threshold angle to determine whether to generate an infill structure that will support the second upper section 106b.

The hollow shell includes a top section 108. The three-dimensional modelling system may compare a third angle 109 of the top section 108 with a threshold angle to determine whether the respective angle satisfies the threshold angle.

The three-dimensional modelling system may compare the third angle 109 for the top section 108 with the threshold angle. Using the comparison, the three-dimensional modelling system may determine whether the third angle 109 for the top section 108 satisfies the threshold angle. The three-dimensional modelling system may determine that the third angle 109 satisfies the threshold angle, e.g., that the third angle 109 is less than the threshold angle or that the third angle 109 is less than or equal to the threshold angle. In response, the three-dimensional modelling system may determine to generate an infill structure 110, shown in FIG. 1B, to support the top section 108. The infill structure 110 creates one or more apertures 112 inside the hollow shell. The apertures 112 represent the portion of the object that will not need to include fill material, e.g., for which a three-dimensional printer does not need to deposit material to create the object.

The three-dimensional modelling system creates an infill structure that fills only a portion of the area inside the hollow structure that is below the top section 108. For instance, the three-dimensional modelling system may analyze the size of the top section 108, the third angle 109, the material a three-dimensional printer will use to create the top section 108, or a combination of two or more of these to determine a size of the infill structure 110 that is smaller than the entire region below the top section 108 and inside the hollow structure. The three-dimensional modelling system may determine the infill structure 110 such that the infill structure 110 does not lie below either of the upper sections 106a-b, as indicated by dashed line 114. For instance, dashed line 114 indicates the right hand side of the infill structure 110 so that the infill structure 110 does not lie below the first upper section 106a. The dashed line 114 is not included in data for the three-dimensional model 100. For example, the three-dimensional modelling system includes the hollow structure, e.g., the skins 101a and the perimeters 101b, and the infill structure 110 in data for the three-dimensional model, e.g., and does not include any data specific only to the line 114 in the data for the three-dimensional model.

The three-dimensional modelling system may determine a type of the infill structure 110 to support the top section 108, e.g., in response to determining that the third angle 109 satisfies the threshold angle. For instance, the three-dimensional modelling system may use properties of the material that will be used to create the top section 108, properties of the three-dimensional extrusion printer that will create the block, or both, to determine a type of the infill structure 110. The three-dimensional modelling system may select a first type of infill structure 110 when the third angle 109 falls within a first angle range, e.g., twenty and thirty degrees. The first type may be a pillar, a particular material for the infill structure 110, or both. The three-dimensional modelling system may select a second type of infill structure 110 when the third angle 109 falls within a second angle range, e.g., when the third angle is zero and the respective surface is parallel to and separated from the print bed, such as the example shown in FIG. 1A. The second type of infill structure 110 may be a complete fill between the bottom 102 of the block and the top section 108, a lattice framework of fill lines that, when stacked in layers of lattices between the bottom 102 and the top section 108, support the top section 108, a hexagonal fill, or another appropriate type of infill structure 110.

The three-dimensional modelling system may determine a type of infill structure 110 by balancing the material necessary to support the top section 108 with a time necessary to deposit the material. For instance, the three-dimensional modelling system may minimize a quantity of material for the infill structure 110, a time necessary to deposit the material, e.g., when a more elaborate infill structure 110 may require less material but take more time to create, or both.

In some implementations, the three-dimensional modelling system may have multiple different threshold angles. For instance, the three-dimensional modelling system may determine a threshold angle for each type of material that will be used to create a surface in the object represented by the three-dimensional model 100. The three-dimensional modelling system may use i) properties of the material or ii) properties of the material and properties of a three-dimensional extrusion printer that will create the object to determine a corresponding threshold angle. For example, the three-dimensional modelling system may have a first threshold angle for a surface that will be created from plastic and a second threshold angle for a surface that will be created from metal. In some examples, the three-dimensional modelling system may use a first threshold angle for the wall 104, a second threshold angle for the first upper section 106a, and a third threshold angle for the top section 108. In some examples, the three-dimensional modelling system may use a first threshold angle for the wall 104, and a second threshold angle for the first upper section 106a and the top section 108.

When the three-dimensional modelling system analyzes a surface that will be adjacent to the print bed of the three-dimensional extrusion printer, e.g., a bottom 102, the three-dimensional modelling system may determine to skip generation of an infill structure for the bottom 102 without comparing an angle of the bottom 102 to a threshold angle. For instance, the three-dimensional modelling system may determine that the bottom 102 will be supported by the print bed and that no infill structures are necessary to support the bottom 102 or that no infill structures inside the object can be created to support the bottom 102.

In some implementations, the three-dimensional model 100 may be for a solid object that will be included in another object. For instance, the block may be part of a larger toy, a model of a house, or another type of object. The three-dimensional modelling system may analyze the block to determine whether the block can be created using a hollow shell and include the block with a hollow shell in the other object.

In some examples, the three-dimensional modelling system may analyze a slice of the block shown in FIGS. 1A-B to determine a path for an extrusion printer tool-head to create an object using the three-dimensional model 100. For instance, after the three-dimensional modelling system creates data for the hollow shell and the infill structure, the three-dimensional modelling system may analyze each slice of the block to determine a path for the tool-head to create the hollow block.

Figure 2:
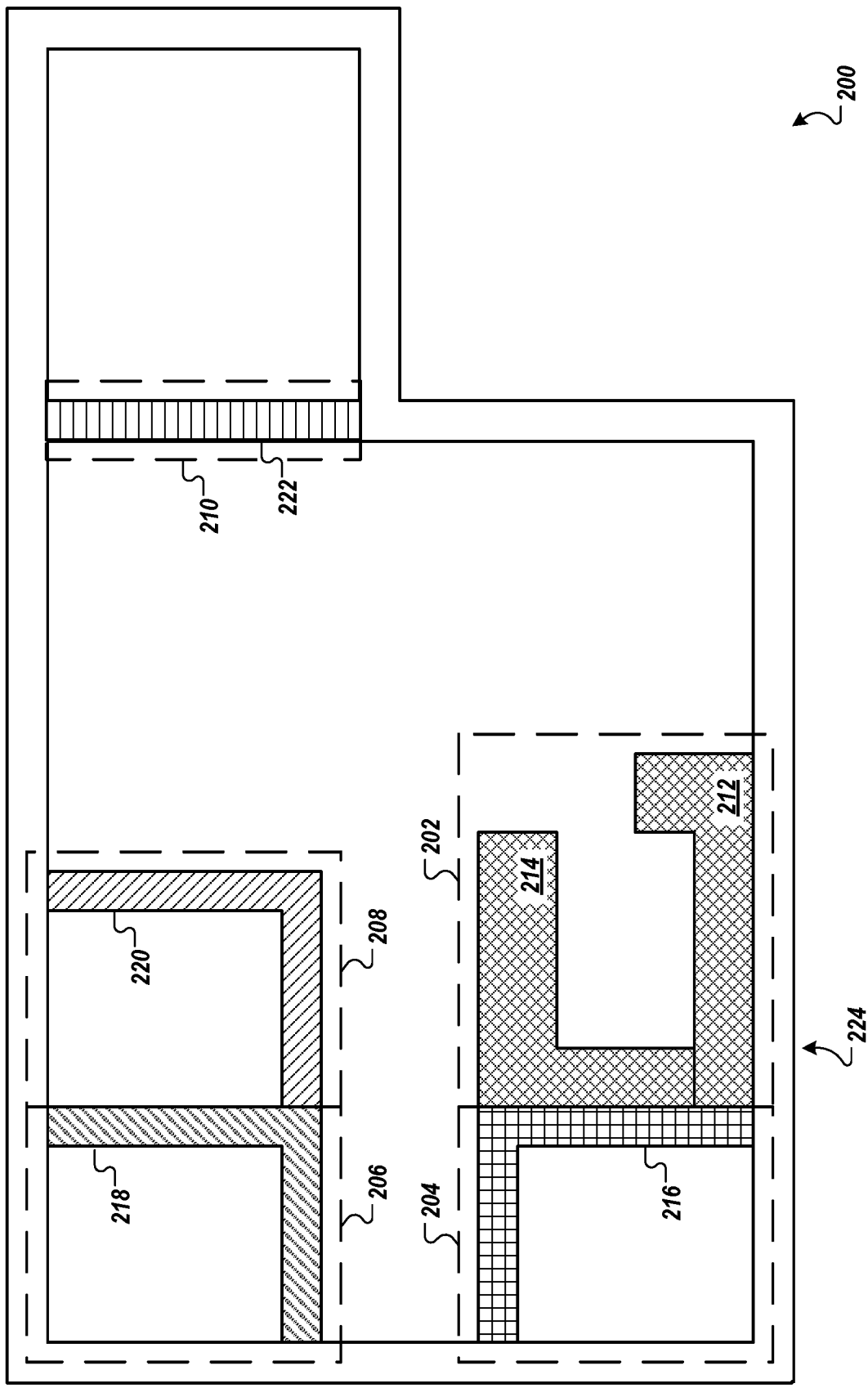
FIG. 2 is an example of a slice of a three-dimensional model for an object.

FIG. 2 is an example of a slice 200 of a three-dimensional model for an object. The object may be any appropriate type of object that can be created by a three-dimensional extrusion printer. For instance, the three-dimensional modelling system may receive a three-dimensional scale model of a house with an attached garage, generally referred to as a house in this document. The house may be a toy house with which a child will play. The house may be an architectural model of a house that will be built or remodeled, or another appropriate type of architectural model. For example, the scale model of a house may be used as a toy into which a person will not walk.

A three-dimensional modelling system may analyze the slice 200 to determine a path for a three-dimensional extrusion printer tool-head that indicates an order in which the tool-head should deposit material, e.g., fill lines, for various structures in the slice 200. For instance, the three-dimensional modelling system may analyze multiple regions 202-210 of internal structures to determine a path for a tool-head to create the internal structures in each of the regions 202-210 while allowing material deposited to form the respective structure to cool before deposition of internal structures in an adjacent region. The regions 202-210 are depicted in FIG. 2 by the dashed lines. The three-dimensional modelling system may split the slice 200 into regions for separate printing of each of the regions so that forces in each of the regions, created because of the printing of materials in the respective region, manifest at a smaller spatial scale. The manifestation of forces at a smaller spatial scale may reduce a likelihood of material in any of the regions 202-210 warping.

The three-dimensional modelling system may determine the path for a tool-head included in a three-dimensional extrusion printer that will create the object using the slice 200. In some examples, the three-dimensional modelling system creates a path for a tool-head included in a fused filament fabrication three-dimensional extrusion printer.

The path for the tool-head moves between the regions 202-210 of internal structures to allow all material deposited in a particular region to cool before deposition of material in an adjacent region to reduce a likelihood that material deposited in the particular region will warp, pull away from material in an adjacent region, or both. For instance, as a material cools, the material may contract. The three-dimensional modelling system determines time periods for the regions 202-210 that allow the material in the respective region to cool, and potentially contract, before a tool-head will deposit material in an adjacent region.

The three-dimensional modelling system may determine a property of a material, a property of a three-dimensional extrusion printer that will print the material, or both, to determine a time period for a region that allows a material in the region to cool. For instance, the three-dimensional modelling system may determine a cooling rate for a material based on an ambient temperature of a three-dimensional extrusion printer. The three-dimensional modelling system may use the cooling rate to determine a time period for the region that allows the material to completely cool or a time period that allows the material to cool to a point at which an amount that the material may contract is less than a threshold amount, a likelihood that the material will contract more is less than a threshold likelihood, or both.

In some implementations, the three-dimensional modelling system may determine a time period for a region using an amount of material deposited in the region. For instance, the three-dimensional modelling system may select a longer time period for a region in which more material will be deposited compared to a shorter time period for a different region in which less material will be deposited.

For the slice 200, a three-dimensional modelling system may select a first region 202 for the beginning of a tool-head path. The three-dimensional modelling system may determine that the tool-head should deposit material for a first structure 212 in the first region 202 and then a second structure 214 in the first region. The three-dimensional modelling system determines a first time period necessary to allow the material for the first structure 212 and the material for the second structure 214 to cool.

The three-dimensional modelling system analyzes one or more of the other regions 204-210 to determine a region that is not adjacent to the first region 202 and that will be the next region for the tool-head path. For instance, the three-dimensional modelling system may determine that three regions 206-210 are not adjacent to the first region 202 and select one of the three regions 206-210. The three-dimensional modelling system may select a fourth region 208.

The three-dimensional modelling system determines one or more structures in the selected fourth region 208. For instance, the three-dimensional modelling system may determine that the fourth region 208 includes a fifth structure 220. The three-dimensional modelling system may generate a path for the tool-head to deposit material for the fifth structure 220.

The three-dimensional modelling system may select a deposition rate for the tool-head to deposit the material for the fifth structure 220 using the first time period to allow the material for the first structure 212 and the material for the second structure 214 to cool. For instance, the three-dimensional modelling system may select a deposition rate so that a length of time for the tool-head to deposit the material for the fifth structure 220 is the same as the duration of the first time period. The three-dimensional modelling system may select a deposition rate so that the length of time for the tool-head to move to the fifth structure 220, move away from the fifth structure 220, and deposit the material for the fifth structure 220 is the same as the duration of the first time period.

In some examples, the three-dimensional modelling system may select a deposition rate for the fourth region 208 so that a time necessary to deposit material in multiple regions is equal to the duration of the first time period. For example, the three-dimensional modelling system may select a deposition rate for the fifth structure 220 so that a sum of a second time period during which the tool-head will deposit the material for the fifth structure 220 and a third time period during which the tool-head will deposit material for a sixth structure 222 in the fifth region 210 will total the duration of the first time period. The sum of the second time period and the third time period may include durations for the tool-head to move to the fifth structure 220, to move to the sixth structure 222, to move away from the sixth structure, or a combination of two or more of these.

Once the three-dimensional modelling system has updated the path for the tool-head to include deposition of one or more structures during the first time period, the three-dimensional modelling system selects a region that is adjacent to the first region 202. The three-dimensional modelling system may select a second region 204 and determine portions of the path for the tool-head to create a third structure 216 included in the second region. The three-dimensional modelling system may determine multiple fill lines for the tool-head to create the third structure 216 and corresponding portions of the path for those multiple fill lines.

The three-dimensional modelling system may select fill lines for the third structure 216 using a type of infill for the third structure 216. For instance, when the third structure 216 has a lattice infill, the three-dimensional modelling system may determine a first set of paths for the tool-head to create the third structure 216 and add the first set of paths to the overall path for the tool-head to create the slice 200. When the third structure 216 has a hexagonal infill, the three-dimensional modelling system may determine a second set of paths for the tool-head to create the third structure 216 and add the second set of paths to the overall path for the tool-head to create the slice 200 instead of the first set of paths. The first set of paths for the tool-head may be different paths than the second set of paths for the tool-head. The third structure 216, and the other structures in the slice 200, may have any appropriate infill structure.

In some implementations, the three-dimensional modelling system may use an open cell lattice infill in which X-Y sections contain no toolpaths connecting unit cells. The unit cells may be one of the structures 212-222, may be a portion of one of the structures 212-222, e.g., a bead deposited for one of the structures 212-222, or both. The three-dimensional modelling system may have one or more settings that define properties for the unit cells. For instance, the properties may include a maximum area for a unit cell, a maximum length, maximum width, or both, for the unit cell, a maximum bead length, or a combination of two or more of these.

The use of an open cell lattice infill may localize contractive forces on the unit cells. For instance, as a deposited bead of material cools, the bead will contract to a percentage of its original length. The percentage of the original length for the cooled bead may be determined using a change in the temperature of the bead when deposited to a cooled temperature and the coefficient of thermal expansion for the material of the bead. By depositing smaller beads, e.g., for unit cells, the structures 212-222, or both, that are allowed to cool before material deposition for an adjacent bead, a three-dimensional modelling system reduces the total size of the shrinkage. For example, when a temperature change, e.g., from 230° C. to 30° C., will cause a deposited bead to shrink by 2%, a bead that is 10 millimeters (mm) long will shrink 0.2 mm while a bead that is 100 mm long will shrink 2 mm, the latter of which may cause a gap between deposited materials. When the three-dimensional modelling system uses an open cell lattice infill, the three-dimensional modelling system reduces localizes contractive forces and reduces an amount of contraction for deposited beads. This may allow the three-dimensional modelling system to maintain cooling shrinkage amounts to a manageable level at which there will be minimal gaps between deposited materials.

The three-dimensional modelling system selects a third region 206 as the last region for the path. The three-dimensional modelling system generates portions of the path for deposition of a fourth structure 218. For instance, the three-dimensional modelling system determines that there are no regions left in the slice 200 for which the three-dimensional modelling system has not generated a respective portion of the path other than the third region 206 and selects the third region 206.

The three-dimensional modelling system may determine whether a fourth time period for cooling of the fifth structure 220 included in the fourth region 208 will pass before deposition of structures in the third region 206 based on the tool-head path. For example, the three-dimensional modelling system may determine whether the fifth structure 220 will sufficiently cool given the tool-head path to allow deposition of the fourth structure 218 in the third region 206. When the three-dimensional modelling system determines that the fourth time period will pass given the tool-head path, the three-dimensional modelling system generates the portions of the path for deposition of the fourth structure 218.

When the three-dimensional modelling system determines that the fourth time period will not pass given the tool-head path, the three-dimensional modelling system determines whether to generate a different path for creation of structures 212-222 in the slice 200. For instance, when the path includes generation of structures in the fifth region 210 before generation of structures in the fourth region 208, the three-dimensional modelling system may change an order of portions of the path by including a portion of the path for the fourth region 208 before a portion of the path for the fifth region 210. When the three-dimensional modelling system changes the order of portions of the path, the three-dimensional modelling system may determine that the new order of the portions of the path will allow the fifth structure 220 in the fourth region 208 sufficient time to cool before deposition of the fourth structure 218 in the third region 206, which is adjacent to the fourth region 208. When the three-dimensional modelling system determines that a new order of the portions of the path that correspond to respective regions 202-210 in the slice 200 does not allow sufficient time for the various structures 212-222 in the regions 202-210 to cool before deposition of material in an adjacent region, the three-dimensional modelling system may change one or more deposition rates for some or all of the structures 212-222 so that the path includes sufficient time for each of the structures in a particular region to cool before deposition of a structure in an adjacent region.

Each of the regions 202-210 may include a single structure, a portion of a structure, or multiple structures. For instance, the first region 202 includes two structures, the first structure 212 and the second structure 214, and the second region 204 includes one structure, the third structure 216. In some examples, the first structure 212 may be in one region and the second structure 214 may be in a separate region.

A three-dimensional printer may create the structures 212-222 using the same material or different materials. For example, the first structure 212, the second structure 214, and the third structure 216 may be created using the same material and are shown separately in FIG. 2 to indicate different portions of the path generated by the three-dimensional modelling system. In some examples, a three-dimensional printer may create the first structure 212 and the second structure 214 from a particular material and may create the third structure 216 from a different material.

The three-dimensional modelling system may generate, for each of the regions, a respective portion of the tool-head path for multiple fill lines that will be deposited in the region. For example, the three-dimensional modelling system may create a first portion of the tool-head path for the first region 202 that will cause a tool-head to deposit twelve fill lines to create the first structure 212 and the second structure 214. The three-dimensional modelling system may create a second portion of the tool-head path for the second region 204 that will cause a tool-head to deposit four fill lines to create the third structure 216.

In some examples, the regions 202-210 for which the three-dimensional modelling system generates portions of the tool-head path may be interior regions. The regions may include infill structures or portions of infill structures. The regions for which the three-dimensional modelling system generates portions of the tool-head path may be exterior regions.

In some implementations, the three-dimensional modelling system can automatically determine the regions 202-210. For instance, the three-dimensional modelling system can receive the slice 200 and determine an initial region for the slice, e.g., that include an entire interior for the slice 200. The three-dimensional modelling system can generate smaller regions from the initial region to reduce a likelihood that material deposited for structures in the region will move when adjacent material is deposited for the slice. The three-dimensional modelling system can use a predetermined maximum size for each region or can automatically determine a size for each of the sub-regions.

In some implementations, the three-dimensional modelling system may determine a maximum fill line length. For example, the three-dimensional modelling system may determine sizes for each of the regions such that the fill lines in each of the regions do not exceed the maximum fill line length. The three-dimensional modelling system may determine sizes of the regions to minimize contraction between fill lines in adjacent regions. For instance, the three-dimensional modelling system may determine sizes of the regions using the maximum fill line length, e.g., as a maximum length, width, or both. The three-dimensional modelling system may adjust one or more dimensions of the regions to minimize contraction between fill lines in adjacent regions. For example, when the structures in the first region 202 and the second region 204 will be created using a single material, the three-dimensional modelling system may determine a point 224 in the first region 202 that will minimize a length of a border between structures in the first region 202 and structures in the second region 204. The three-dimensional modelling system may move the right border of the second region 204 to the point 224 to reduce the length of contact between the fill lines, and corresponding structures, in the adjacent regions.

The three-dimensional modelling system may use a type of material for structures in a region when determining the regions. For instance, if the three-dimensional modelling system determines that a single material will be used to create the first structure 212, the second structure 214, and the third structure 216, the three-dimensional modelling system may adjust the size of the regions, e.g., to minimize contact between the structures in the regions. If the three-dimensional modelling system determines that different materials will be used to create the structures in the first region 202 and the second region 204, e.g., that a first material will be deposited for the first structure 212 and the second structure 214 and a second material will be deposited for the third structure 216, the three-dimensional modelling system may maintain the sizes of the first region 202 and the second region 204.

In some implementations, a three-dimensional modelling system may determine a time for a tool-head to move between regions and use the time to determine a path for the tool-head. For instance, the three-dimensional modelling system may use the time for the tool-head to move between regions to allow material in a region enough time to cool. The three-dimensional modelling system may use the movement time in addition to the deposition time to determine the path for the tool-head and whether the three-dimensional modelling system can select a region for deposition that is adjacent to another region in which deposited material has cooled.

In some implementations, the three-dimensional modelling system may determine different cooling rates for different materials in a slice. For instance, the three-dimensional modelling system may determine that a first structure 212 is metal and a third structure 216 is plastic and different cooling rates for the first structure 212 and the third structure 216. The three-dimensional modelling system may determine different time periods for the regions in which the structures belong to allow the structures sufficient time to cool.

Figure 3:
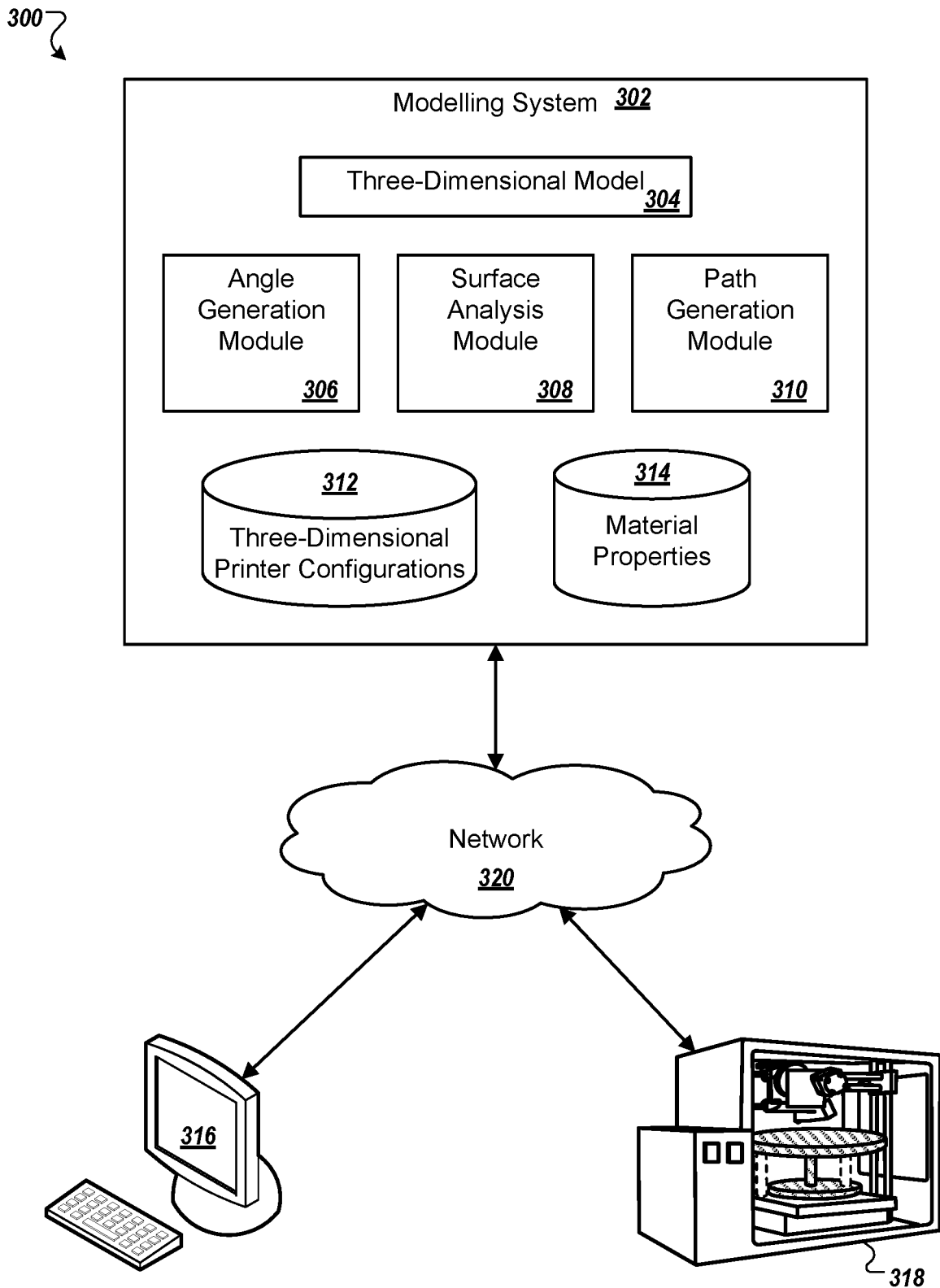
FIG. 3 is an example of an environment in which a three-dimensional modelling system may receive a three-dimensional model.

FIG. 3 is an example of an environment 300 in which a three-dimensional modelling system 302 may receive a three-dimensional model 304. The three-dimensional modelling system 302 may receive the three-dimensional model 304 from a client device 316. For example, the three-dimensional modelling system 302 may receive the three-dimensional model 304 as part of a request from the client device 316 to cause a three-dimensional extrusion printer 318 to create an object represented by the three-dimensional model 304. In some examples, the three-dimensional extrusion printer 318 may be a fused filament fabrication printer.

The three-dimensional modelling system 302 may determine materials that will be used to create an object represented by the three-dimensional model 304. The three-dimensional modelling system 302 may select a particular type of three-dimensional extrusion printer 318 using properties of the materials in the material properties database 314, the materials, or both. For example, the three-dimensional modelling system 302 may provide the three-dimensional model 304 to a fused filament fabrication printer when the object represented by the three-dimensional model 304 will be formed using a material or multiple materials with a high coefficient of thermal expansion.

An angle generation module 306, included in the three-dimensional modelling system 302, may generate, for a solid object or a solid portion of an object, a hollow shell for the object. The angle generation module 306 may analyze the exterior surfaces of the object that enclose the solid fill for the object to determine the hollow shell for the object. The angle generation module 306 may determine a minimum thickness of the hollow shell using properties of the object, e.g., a material of the object, expected forces that will be applied to the object, or both. The angle generation module 306 may determine different thicknesses for different portions of the hollow shell depending on the location of the portion in the hollow shell. The angle generation module 306 may update the three-dimensional model 304 using data that represents the hollow shell for the object.

The angle generation module 306 analyze multiple surfaces in the hollow shell to determine angles of those surfaces. The angle generation module 306 may determine angles of the surfaces with respect to a print bed on which an object, represented by the three-dimensional model 304, will be created by the three-dimensional extrusion printer 318. For instance, the angle generation module 306 may perform one or more of the steps described above with reference to FIG. 1 to determine an angle of an exterior surface, an interior surface, or both. In some examples, the angle generation module 306 may determine a threshold angle. The threshold angle may be for all surfaces in the object or a subset of the surfaces in the object, e.g., when all of the surfaces in the subset will be created by the three-dimensional extrusion printer 318 using a particular material and all surfaces in a different subset will be created by the three-dimensional extrusion printer 318 using a different material.

A surface analysis module 308 compares the angles determined by the angle generation module 306 with respective threshold angles to determine whether to generate a support for the respective surface in the three-dimensional model 304. For example, when the surface analysis module 308 determines that a first angle of a first surface does not satisfy a threshold angle, the surface analysis module 308 skips the first surface and does not generate a support for the first surface. When the surface analysis module 308 determines that a second angle of a second surface satisfies a threshold angle, the surface analysis module 308, or a support generation module (not shown) included in the three-dimensional modelling system 302, generates data for a support in the three-dimensional model 304. The support is an infill structure, inside the hollow shell of the object represented by the three-dimensional model 304, that will support the second surface during creation of the object by the three-dimensional extrusion printer 318 and during use of the created object. The surface analysis module 308 may perform one or more of the steps described above with reference to FIG. 1 to compare the surface angles with the threshold angles and generate supports for the surfaces for which the surface angle satisfies a corresponding threshold angle.

The angle generation module 306 or the surface analysis module 308 can determine a threshold angle. For instance, the surface analysis module 308 may determine a material that will be used to create a particular surface. The surface analysis module 308 accesses a material properties database 314 to determine properties for the material. The surface analysis module 308 can use the properties for the material to determine the threshold angle for the material.

In some implementations, the surface analysis module 308 uses configuration properties of the three-dimensional extrusion printer 318 when determining the threshold angle. For example, the surface analysis module 308 may access a three-dimensional printer configuration database 312 to determine configuration properties for the three-dimensional extrusion printer 318, e.g., using an identifier for the three-dimensional extrusion printer 318. The surface analysis module 308 may use the configuration properties and the properties for the material to determine the threshold angle for the material.

A path generation module 310, included in the three-dimensional modelling system 302, may generate a path for a tool-head, included in the three-dimensional extrusion printer 318, to print the structures included in the object represented by the three-dimensional model 304. The path generation module 310 may generate a path for a slice in the three-dimensional model 304. In some examples, the path generation module 310 may generate a path for each slice in the three-dimensional model 304. The path generation module 310 may use one or more of the steps described with reference to FIG. 2 to generate a path for the tool-head.

The path generation module 310 may generate a path for a slice in the three-dimensional model 304 to which the surface analysis module 308 added data for surface supports, e.g., after analysis of the three-dimensional model 304 by the angle generation module 306 and the surface analysis module 308 and creation of the hollow shell. In some examples, the path generation module 310 may generate a path for a slice in the three-dimensional model 304 for which the surface analysis module 308 has not generated any support data. For instance, the path generation module 310 may analyze the three-dimensional model 304 without either the angle generation module 306 or the surface analysis module 308 analyzing any data for the three-dimensional model 304.

The path generation module 310 can use material properties database 314 when generating the path for the slice. For example, the path generation module 310 determines a cooling time for a particular material that will be deposited in the slice by retrieving property data for the material from the material properties database 314.

In some examples, the path generation module 310 uses configuration properties of the three-dimensional extrusion printer 318 when generating the path for the slice. For instance, the path generation module 310 accesses the three-dimensional printer configuration database 312 to determine a temperature at which the three-dimensional extrusion printer 318 will deposit the material, a temperature of an atmosphere in which the material will be deposited, or both. The path generation module 310 can use one or more temperatures to determine the path for the slice.

The three-dimensional modelling system 302 may generate multiple slices of the three-dimensional model. Each of the slices may include data for multiple structures of the object represented by the respective slice. The three-dimensional modelling system 302 may generate, for each of the slices, tool path data for each of the slices that indicates a path for a tool-head to create the structures represented by the slice.

The three-dimensional modelling system 302 may provide the data for each of the slices to the three-dimensional extrusion printer 318 to cause the three-dimensional extrusion printer 318 to generate the respective portion of the object. For instance, the three-dimensional modelling system 302 may provide a first slice to the three-dimensional extrusion printer 318. The three-dimensional extrusion printer 318 may use the first slice to print the structures represented by the first slice. The three-dimensional modelling system 302 may sequentially provide the three-dimensional extrusion printer with subsequent slices to cause the three-dimensional extrusion printer to create corresponding structures of the object using the subsequent slices. For instance, the three-dimensional extrusion printer 318 may use each of the subsequent slices to add another layer to the printed portion of the object until the object is completed.

In some implementations, the three-dimensional modelling system 302 may be included in or be part of the three-dimensional extrusion printer 318. For instance, the three-dimensional extrusion printer 318 may receive the three-dimensional model 304 from the client device 316 and store the three-dimensional model 304 in memory. The three-dimensional extrusion printer 318 may use the angle generation module 306, the surface analysis module 308, the path generation module 310, or a combination of two or more of these, to analyze the three-dimensional model 304. The three-dimensional extrusion printer 318 may use data for the analyzed three-dimensional model 304 to create an object represented by the three-dimensional model 304.

The three-dimensional modelling system 302 is an example of a system implemented as computer programs on one or more computers in one or more locations, in which the systems, components, and techniques described in this document are implemented. The client device 316 may include personal computers, mobile communication devices, and other devices that can send and receive data over a network 320. The network 320, such as a local area network (LAN), wide area network (WAN), the Internet, or a combination thereof, connects the client device 316, three-dimensional modelling system 302, and the three-dimensional extrusion printer 318. The three-dimensional modelling system 302 may use a single server computer or multiple server computers operating in conjunction with one another, including, for example, a set of remote computers deployed as a cloud computing service.

In some examples, the environment 300 does not include a separate three-dimensional modelling system 302 and client device 316. For instance, the three-dimensional modelling system 302 may provide the three-dimensional model 304 directly to the three-dimensional extrusion printer 318 without receiving the three-dimensional model 304 from a separate device, e.g., the client device 316. In these examples, the three-dimensional modelling system 302 can connect directly to the three-dimensional extrusion printer 318 or can connect to the three-dimensional extrusion printer through any appropriate type of network, e.g., a LAN.

Figure 4:
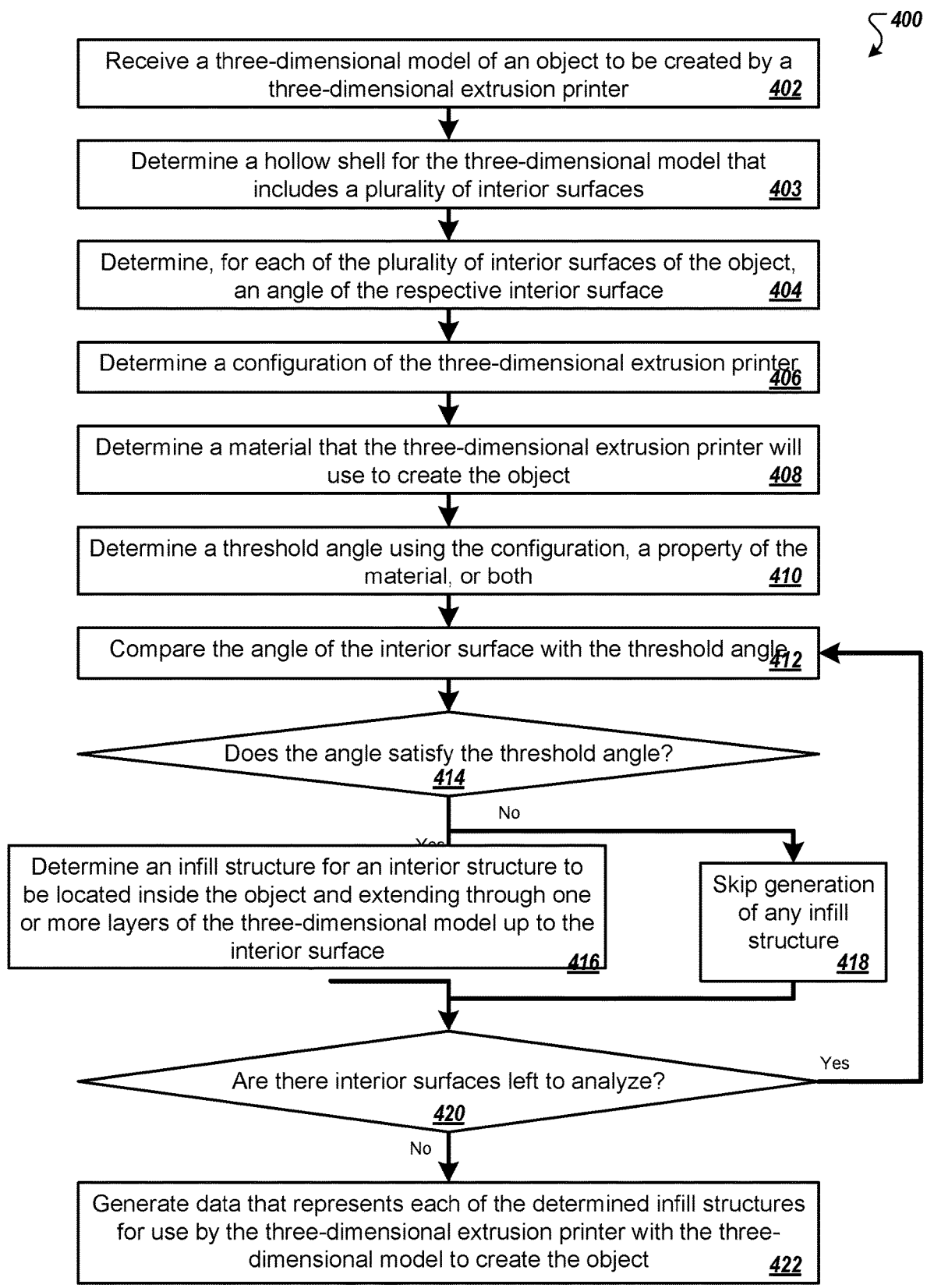
FIG. 4 is a flow diagram of a process for generating data for infill structures that will support surfaces of an object.

FIG. 4 is a flow diagram of a process 400 for generating data for infill structures that will support surfaces of an object. For example, the process 400 can be used by the three-dimensional modelling system 302 from the environment 300.

A modelling system receives a three-dimensional model of an object to be created by a three-dimensional extrusion printer (402). For instance, the modelling system receives the three-dimensional model from a client device. In some examples, the modelling system may receive the three-dimensional model from memory. The three-dimensional model includes only data representing exterior surfaces of the object that will be a solid object when printed.

The modelling system may determine determining a hollow shell for the three-dimensional model that includes a plurality of interior surfaces (403). For instance, the modelling system determines an exterior shell for the three-dimensional model that includes a hollow aperture on the inside that reduces the material requirements for creating the object.

The modelling system determines, for each of the plurality of interior surfaces of the object, an angle of the respective interior surface (404). For example, the modelling system determines each of the interior surfaces of the object represented in the three-dimensional model. The modelling system may use any appropriate method to determine the angle of a particular interior surface. The surfaces may be polygon meshes or any other appropriate type of surface for the object.

In some implementations, when a surface is not flat, the modelling system may determine multiple angles for the surface. The modelling system may divide the non-flat surface into multiple sections. Each of the sections may have the same angle, e.g., a single angle, or multiple angles within a predetermined threshold value of the other angles for the section. For instance, the modelling system may divide a non-flat surface into multiple sections each of which have angles within the predetermined threshold value of the other angles for the respective section. The modelling system may determine, for each of the multiple sections, an average angle for the section. The modelling system may use the average angle for the section when analyzing the section. In some examples, the modelling system may determine, for each of the multiple sections, a largest angle for the section. In these examples, the modelling system may use the largest angle for the section when analyzing the section. For instance, when the modelling system determines that a particular section has three angles, 42°, 43.4°, and 44.2°, the modelling system may select 44.2° as the angle for the particular section.

The modelling system determines a configuration of the three-dimensional extrusion printer (406). For instance, the modelling system may determine settings of a print-head included in the three-dimensional extrusion printer, settings of the three-dimensional extrusion printer, or both, that will be used to create the object using the three-dimensional model. Some examples of settings for a three-dimensional extrusion printer include whether the printer includes a cooling fan directed toward the print-head, whether the deposition chamber in the printer is heated, the temperature of the deposition chamber, a diameter of an extruder nozzle in the print-head, print speed, bead diameter, and layer height.

The modelling system determines a material that the three-dimensional extrusion printer will use to create the object (408). The modelling system may determine that the material is a plastic, a metal, or another appropriate material.

The modelling system determines a threshold angle using the configuration, a property of the material, or both (410). For example, the modelling system may use the configuration of the three-dimensional extrusion printer, the property of the material, or both, as input to determine the threshold angle. The modelling system may determine a first value for the threshold angle when the material is a first material, e.g., plastic, and a second value for the threshold angle when the material is a second material, e.g., metal. The first value may be greater than the second value. For instance, the modelling system may determine that a first viscosity of a first material, e.g., a plastic, is lower than a second viscosity of a second material, e.g., a metal, and use a first threshold angle for the first material that is a larger angle than a second threshold angle for the second material.

The modelling system compares the angle of the interior surface with the threshold angle (412). For instance, the modelling system compares a value of the angle of the interior surface with a value for the threshold angle.

The modelling system determines whether the angle satisfies the threshold angle (414). The modelling system may determine whether a value of the angle is less than a value of the threshold angle. In some examples, the modelling system may determine whether a value of the angle is less than or equal to a value of the threshold angle. The modelling system may use a result of the comparison to determine whether the angle satisfies the threshold angle.

In some implementations, the modelling system may perform steps 412 and 414 for multiple surfaces. For instance, the modelling system may compare, for each of the multiple surfaces, a value of the respective angle with a value of the threshold angle and determine whether the value of the respective angle satisfies the value of the threshold angle using a result of the comparison. The modelling system may determine, for each surface in a first subset of the multiple surfaces, that the angle does not satisfy the threshold angle. The modelling system may determine, for each surface in a second subset of the multiple surfaces, that the angle does not satisfy the threshold angle. The second subset is a different subset of surfaces from the multiple surfaces than the first subset. The second subset is a disjoint subset from the first subset.

The surfaces may be exterior surfaces. In some implementations, the surfaces are interior surfaces, e.g., and not exterior surfaces. In some examples, the multiple surfaces may include both interior surfaces and exterior surfaces.

In response to determining that the surface satisfies the threshold angle, the modelling system determines an infill structure for an interior structure to be located inside the object and extending through one or more layers of the three-dimensional model up to the interior surface (416). The layers may be slices of the three-dimensional model. The modelling system may determine any appropriate type of infill structure for an interior structure. For example, the modelling system may use a hexagonal infill structure for the interior structure. In some examples, the modelling system may use a rectilinear infill structure, a concentric infill structure, a honeycomb infill structure, or a combination of two or more of these. The modelling system may select an infill structure to minimize material necessary to create the interior structure while providing an appropriate strength for the interior structure.

When created by a three-dimensional printer, the interior structure supports the corresponding surface. For instance, if the three-dimensional printer were to try to create the surface without the interior structure, the surface may not be able to support itself, e.g., would collapse. The creation of the interior structure in the three-dimensional model allows the three-dimensional printer to create the surface using data for the three-dimensional model.

The interior structure may extend through multiple slices of the three-dimensional model. The modelling system may create the interior structure between a lower surface below the surface and extending through each slice of the three-dimensional model up to the surface. For instance, the interior structure may extend through all slices between the lower surface below the surface and the surface. In some examples, the modelling system creates an interior structure, in the three-dimensional model, that extends from a bottom surface of the three-dimensional model to the surface, e.g., through each layer of the model between the bottom surface and the surface.

In response to determining that the surface does not satisfy the threshold angle, the modelling system skips generation of any infill structure (418). For instance, the modelling system determines not to generate an interior structure, or a corresponding infill structure for an interior structure, for the surface.

The modelling system may store data indicating which of the surfaces the modelling system has analyzed. For instance, the data may indicate that the modelling system compared a value of an angle for the surface with a value for a threshold angle. The modelling system may use the data to later determine that the modelling system analyzed the surface, whether or not the angle for the surface satisfies the threshold angle, or both. The data may indicate whether the surface needs a support or the modelling system added a support to the three-dimensional model.

The modelling system determines whether there are interior surfaces left to analyze (420). For example, the modelling system uses the data that indicates which of the surfaces the modelling system has analyzed to determine whether or not there are more surfaces in the three-dimensional model to analyze. The modelling system may analyze only interior surfaces of the three-dimensional model. In these examples, the modelling system determines whether there are interior surfaces to analyze. The modelling system may analyze only interior surfaces. In these examples, the modelling system determines whether there are interior surfaces to analyze. In some implementations, the modelling system analyzes both interior surfaces and interior surfaces. In these implementations, the modelling system determines whether there are any interior surfaces or any interior surfaces left to analyze.

The modelling system generates data that represents each of the determined infill structures for use by the three-dimensional extrusion printer with the three-dimensional model to create the object (422). For instance, the modelling system uses the infill structures for the interior structures to generate the data that represents the infill structure. The data indicates the slices of the three-dimensional model through which the interior structure, with the infill structure, passes. In some examples, the modelling system may perform part of the step 422 when determining the infill structure, e.g., as part of step 416. For example, when the modelling system determines the infill structure for a particular interior structure, the modelling system may generate the data that represents the infill structure for the particular interior structure. The modelling system may add the data for the infill structures to the three-dimensional model.

The order of steps in the process 400 described above is illustrative only, and generating data for infill structures that will support surfaces of the object can be performed in different orders. For example, the modelling system may determine the material that a three-dimensional extrusion printer will use to create the object represented by the three-dimensional model before determining a configuration of the three-dimensional extrusion printer.

In some implementations, the process 400 can include additional steps, fewer steps, or some of the steps can be divided into multiple steps. For example, the modelling system may perform steps 402, 404, 416, 418, and 422 without performing the other steps of the process 400. In some examples, the modelling system may perform steps 402 and 404, a portion of step 410, and steps 412 through 422. For instance, the modelling system may determine, as the portion of step 410, the threshold angle using the configuration of the three-dimensional printer, the property of the material, both, or neither. In some examples, the modelling system may send data for the three-dimensional model to a three-dimensional extrusion printer to cause the three-dimensional extrusion printer to create an object represented by the three-dimensional object.

In some implementations, the modelling system may compare the data that represents the determined infill structures and the hollow shell with the data for a solid object to determine whether creation of the object using the infill structures and the hollow shell satisfies one or more efficiency criteria. The efficiency criteria may include a quantity of material saved by creating the object with the hollow shell and the infill structures instead of creating a solid object. The efficiency criteria may include an amount of time saved by creating the object with the hollow shell and the infill structures instead of creating a solid object. The efficiency criteria may include a quantity of beads that will not be deposited by creating the object with the hollow shell and the infill structures instead of creating a solid object. The efficiency criteria may include a value that indicate whether the modified object created using the hollow shell and the infill structures will have a strength within a threshold value of the original solid object.

When the modelling system determines that an efficiency for the modified object, e.g., for the infill structures and the hollow shell, satisfies a threshold efficiency, the modelling system may send the data for the modified object to a three-dimensional printer for creation of the object with one or more apertures in the object. When the modelling system determines that an efficiency for the modified object does not satisfy the threshold efficiency, the modelling system sends data for an unmodified object, e.g., the solid object, to a three-dimensional printer for creation of the solid object.

Figure 5:
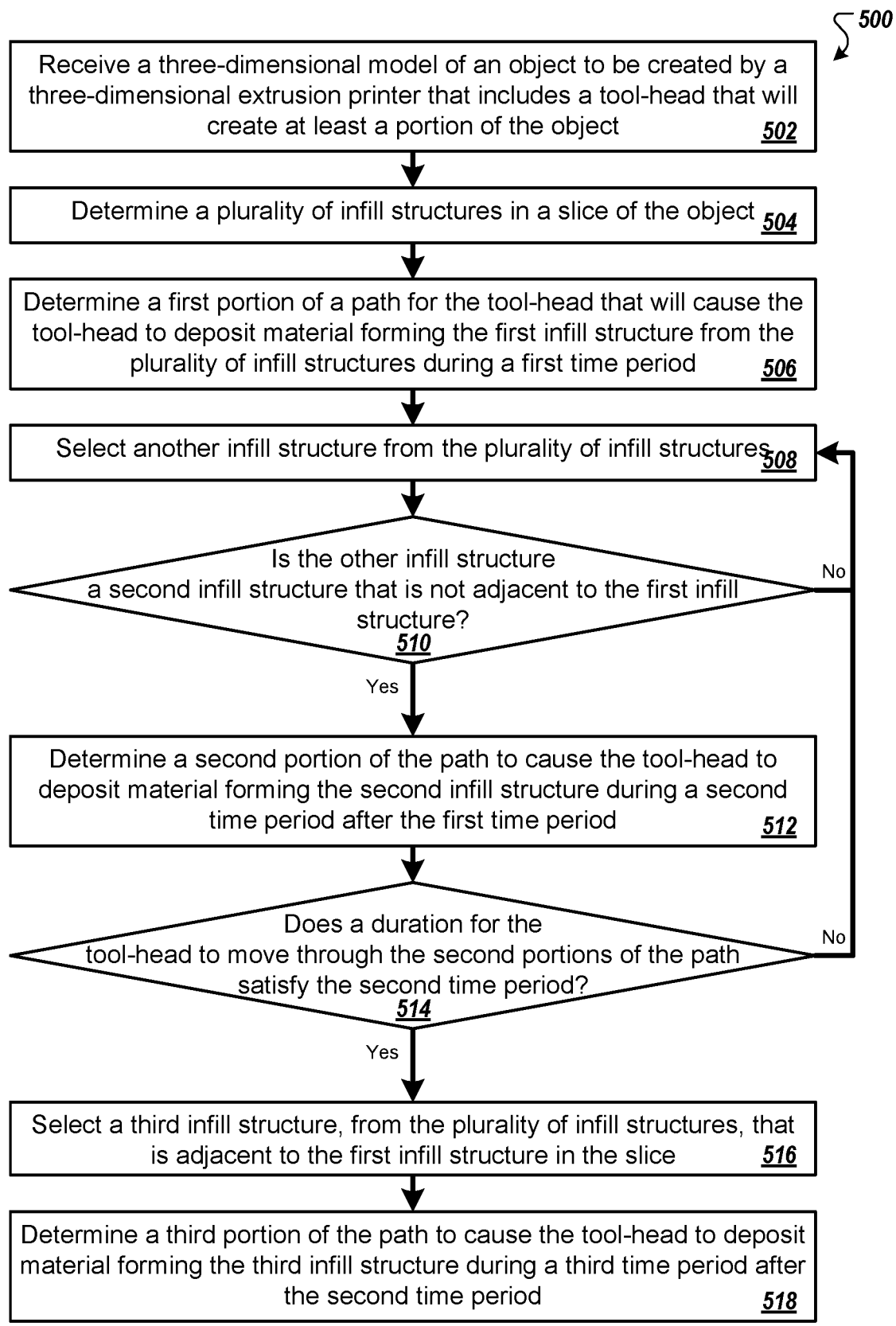
FIG. 5 is a flow diagram of a process for generating a tool-head path.

FIG. 5 is a flow diagram of a process 500 for generating a tool-head path. For example, the process 500 can be used by the three-dimensional modelling system 302 from the environment 300.

A modelling system receives a three-dimensional model of an object to be created by a three-dimensional extrusion printer that includes a tool-head that will create at least a portion of the object (502). For instance, the modelling system receives the three-dimensional model from a client device. In some examples, the modelling system may receive the three-dimensional model from memory.

The modelling system determines a plurality of infill structures in a slice of the object (504). The modelling system may create multiple slices of the three-dimensional model. For each of the slices, the modelling system determines multiple infill structures in the slice.

The modelling system determines a first portion of a path for the tool-head that will cause the tool-head to deposit material forming the first infill structure from the plurality of infill structures during a first time period (506). For examples, the modelling system selects one of the multiple infill structures as the first infill structure. The modelling system may select the first infill structure, from the multiple infill structures randomly.

In some examples, the modelling system may select, as the first infill structure, an infill structure from a region in the slice with a highest density of infill structures, e.g., a highest quantity of infill structures. For instance, when the slice is part of a three-dimensional scale model of a house, a particular region of the house, e.g., a bedroom, may have a higher density of infill structures than another region of the house, e.g., a living room. The modelling system may determine the region with the highest density of infill structures because there are likely to be more infill structures that are adjacent to other infill structures in that region. The modelling system may select an infill structure that is adjacent to a highest quantity of other infill structures.

The modelling system may determine a material that the three-dimensional extrusion printer will use to create the object. In some examples, the modelling system may determine a material that the three-dimensional extrusion printer will use to create the first infill structure, e.g., in examples in which the object is created using multiple different materials.

The modelling system may determine a cooling time for the material using a first temperature at which the material will be deposited, a second temperature of an area in which the material will be deposited, one or more properties of the material, or a combination of two or more of these. The second temperature may include multiple second temperatures. The properties of the material may include a cooling time for the material. The properties of the material may include any appropriate type of material properties.

The area in which the material will be deposited may include a chamber in which the three-dimensional extrusion printer creates the first infill structure. The second temperature may include a temperature of the chamber. The area may include atmosphere or other gases. The second temperature may include a temperature of the atmosphere or other gases.

The second temperature may be a temperature of a particular material onto which the material will be deposited. In some examples, the modelling system may determine a temperature of a base that supports the object during creation as a temperature of an area in which the material will be deposited. The modelling system may determine a temperature of another material that has been deposited, another material that will be deposited, or both, as a temperature of an area in which the material will be deposited. In some examples, the area in which the material will be deposited may have multiple second temperatures, e.g., one for a gas in which the material will be deposited and one for the particular material onto which the material will be deposited.

One or more of the temperatures may be predicted temperatures. For instance, the modelling system may determine the temperatures before the three-dimensional extrusion printer creates the object. In these examples, the temperatures are predicted temperatures. In some examples, the modelling system may determine the temperatures while the three-dimensional extrusion printer creates the object. In these examples, some of the temperatures may be actual temperatures, some of the temperatures may be predicted temperatures, or both. For instance, the modelling system may provide the three-dimensional extrusion printer with a first slice path for a tool-head, included in the three-dimensional extrusion printer. While the tool-head uses the first slice path to create a first slice of the object, the modelling system may create a second slice path for a second slice of the object that is adjacent to and directly above the first slice. The modelling system may use data from the creation of the first slice to determine the second slice path, e.g., data that indicates one or more actual temperatures for the three-dimensional extrusion printer, the object being created by the three-dimensional extrusion printer, or both.

The modelling system may determine a duration for a second time period using the cooling time for the material. The modelling system may determine the duration to allow the material sufficient time to cool before deposition of another material adjacent to the material. For instance, the modelling system may select the second time period such that the material is less likely to warp when another material is deposited adjacent to the material.

In some implementations, the modelling system may determine a deposition rate for the first infill structure, e.g., the first portion of the path. The modelling system may determine the deposition rate using a duration of the first time period, the duration of the second time period, a property of the material, or a combination of two or more of these.

The modelling system selects another infill structure from the plurality of infill structures (508). The modelling system may use any appropriate method to select the other infill structure. For example, the modelling system may select the other infill structure at random. The modelling system may assign, to each of the infill structures, a number, e.g., an identifier. The modelling system may select an infill structure at random by generating a random number and determining the identifier that is closest to, or the same as, the random number. In some examples, the modelling system may select an infill structure as the other infill structure that is adjacent to a highest quantity of other infill structures, e.g., for which the modelling system has not determined respective portions of the path.

The modelling system determines whether the other infill structure is a second infill structure that is not adjacent to the first infill structure (510). For example, the modelling system analyzes the boundaries of the other infill structure to determine whether one of the boundaries of the second infill structure is adjacent to a boundary of the first infill structure. In some examples, the modelling system may select an infill structure that is adjacent to a highest quantity of other infill structures and that is not adjacent to the first infill structure.

If one of the boundaries is adjacent to a boundary of the previous infill structure, e.g., the first infill structure, the modelling system selects a different infill structure, e.g., repeats step 508. When the modelling system determines that there is only one infill structure left and that the one remaining infill structure is adjacent to the previous infill structure, the modelling system may begin the process 500 again, e.g., with a different initial infill structure, a different path to create the various infill structures, or both. In some examples, when the modelling system determines that there is only one infill structure left and that the one remaining infill structure is adjacent to the previous infill structure, the modelling system adds a wait period for the tool-head before the tool-head will create the last infill structure. For example, the modelling system adds instructions to data that represents the path for the current slice that indicates that the tool-head should wait for a particular period of time before beginning deposition of the last infill structure. In some examples, when the modelling system determines that there is only one infill structure left and that the one remaining infill structure is adjacent to the previous infill structure, the modelling system may change a deposition rate of one or more other infill structures so that deposition of the last infill structure will begin after the infill structures adjacent to the last infill structure have cooled for the determined cooling periods.

When the modelling system determines that the second infill structure is not adjacent to the first infill structure, the modelling system determines a second portion of the path to cause the tool-head to deposit material forming the second infill structure during a second time period after the first time period (512). The modelling system may determine a quantity of beads for the tool-head to deposit when forming the second infill structure. The modelling system may use the quantity of beads to determine the second portion of the path. The modelling system may determine at which end of the second infill structure the tool-head should begin to deposit material for the second infill structure, e.g., an end closest to a last location at which the tool-head will deposit material for the first infill structure. The modelling system may determine a direction for the second portion of the path along which the tool-head will move to form the second infill structure. The modelling system may use the determined end of the second infill structure, the direction for the second portion of the path, or both, to determine at least part of the second portion of the path.

In some implementations, the modelling system may determine a deposition rate for the second infill structure, e.g., the second portion of the path. The modelling system may determine the deposition rate using a duration of the second time period, a property of the material that will form the second infill structure, or a combination of two or more of these. In some examples, the modelling system may determine the deposition rate for the second infill structure using a size of the second infill structure, an amount of material that will be deposited to form the second infill structure, or both.

The modelling system may adjust the deposition rate based on a current duration of time to deposit material for the second infill structure and the determined duration for the second time period. For instance, when the current duration is less than the determined duration for the second time period the modelling system may adjust the deposition rate to reduce or increase the current duration. In some examples, when the current duration is greater than the determined duration for the second time period, the modelling system may determine whether or not to change the current duration, e.g., the modelling system might not change the current duration.

The modelling system determines whether a duration for the tool-head to move through the second portions of the path satisfies the second time period (514). For example, the modelling system determines whether a time for the tool-head to deposit material for the second infill structure satisfies, e.g., is greater than or equal to, the duration for the second time period. In some examples, the duration satisfies the second time period when the duration is greater than a predetermined duration of the second time period.

Since the modelling system determined a duration of the second time period to allow the first infill structure to cool before deposition of the third infill structure, adjacent to the first infill structure, by the tool-head of the three-dimensional extrusion printer, the modelling system determines whether the second portion of the path causes the tool-head to deposit material during the entirety of the second time period or whether more time is necessary to allow the first infill structure to cool. The modelling system may use a time period for the tool-head to move from the first infill structure to the second infill structure, a time period for the tool-head to move from the second infill structure to a third infill structure, or both, when determining whether the duration for the tool-head to move through the second portions of the path satisfies the second time period. For instance, the modelling system may add one or more durations of the movement time periods with the duration for deposition of the second infill structure, as the second portion of the path, to determine whether the duration of the second portion of the path satisfies the second time period.

When the modelling system determines that the duration for the tool-head to move through the second portions of the path does not satisfy the second time period, the modelling system selects another infill structure and generates a path for the other infill structure. For instance, the modelling system performs steps 508 through 512 until the duration for the tool-head to move through all of the second portions of the path satisfies the second time period. The duration for the second portions of the path satisfies the second time period when a duration that the tool-head will take to move to each of the second infill structures, deposit material for the second infill structures that are not adjacent to the first infill structure, or both, is greater than, equal to, or both, the predetermined duration for the second time period.

The modelling system selects a third infill structure, from the plurality of infill structures, that is adjacent to the first infill structure in the slice (516). The modelling system may determine the infill structures in the slice that are adjacent to the first infill structure. The determined infill structures may be infill structures for which the modelling system has not yet generated a portion of the path for the slice that will cause the tool-head to deposit material to form the corresponding infill structure. If there is only one infill structure in the slice for which the modelling system has not generated a portion of the path for the slice, the modelling system may select the one infill structure. When there are multiple infill structures in the slice for which the modelling system has not yet generated a portion of the path for the slice, the modelling system may select one of the multiple infill structures at random. In some examples, when there are multiple infill structures in the slice for which the modelling system has not generated a portion of the path for the slice, the modelling system may select one of the multiple infill structures that is adjacent to the first infill structure and a highest quantity of other infill structures for which the modelling system has not created portions of the path for the slice.

The modelling system determines a third portion of the path to cause the tool-head to deposit material forming the third infill structure during a third time period after the second time period (518). For instance, the modelling system determines an end of the third infill structures that is closest to a last location at which the tool-head will deposit material for the second infill structure. The modelling system may use the determined end as the beginning of the third portion of the path.

In some implementations, the process 500 can include additional steps, fewer steps, or some of the steps can be divided into multiple steps. For example, the modelling system may determine a duration of time for which a material that will be deposited in a previous layer has cooled. When the three-dimensional printer will create multiple layers for a particular infill structure, the modelling system may determine when the three-dimensional printer will deposit material for the particular infill structure and directly below an area in a current slice for the particular infill structure. When a duration of time for the material in the previous slice to cool does not satisfy a threshold duration, e.g., the material in the previous layer will not likely have cooled sufficiently, the modelling system may select another infill structure for the path.

The modelling system may repeat the process 500, or portions of the process 500, for all infill structures in a current slice. For instance, the modelling system may select a first infill structure and then repeat the steps for selection of second infill structures and third infill structures until the modelling system generates portions of the path for all of the infill structures in a current slice.

The modelling system may provide data for the slice and the path to a three-dimensional extrusion printer after generation of the path. For instance, the modelling system may generate paths for all slices of a three-dimensional model and then provide data representing the slices and the paths to the three-dimensional extrusion printer. In some examples, the modelling system may generate a path for a first slice and provide data for the first slice and the path to a three-dimensional extrusion printer, e.g., to cause the three-dimensional extrusion printer to create a portion of an object represented by the first slice. The modelling system then generates a path for a second slice that is directly adjacent to and on top of the first slice. The modelling system provides the generated path and data for the second slice to the three-dimensional extrusion printer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 6:
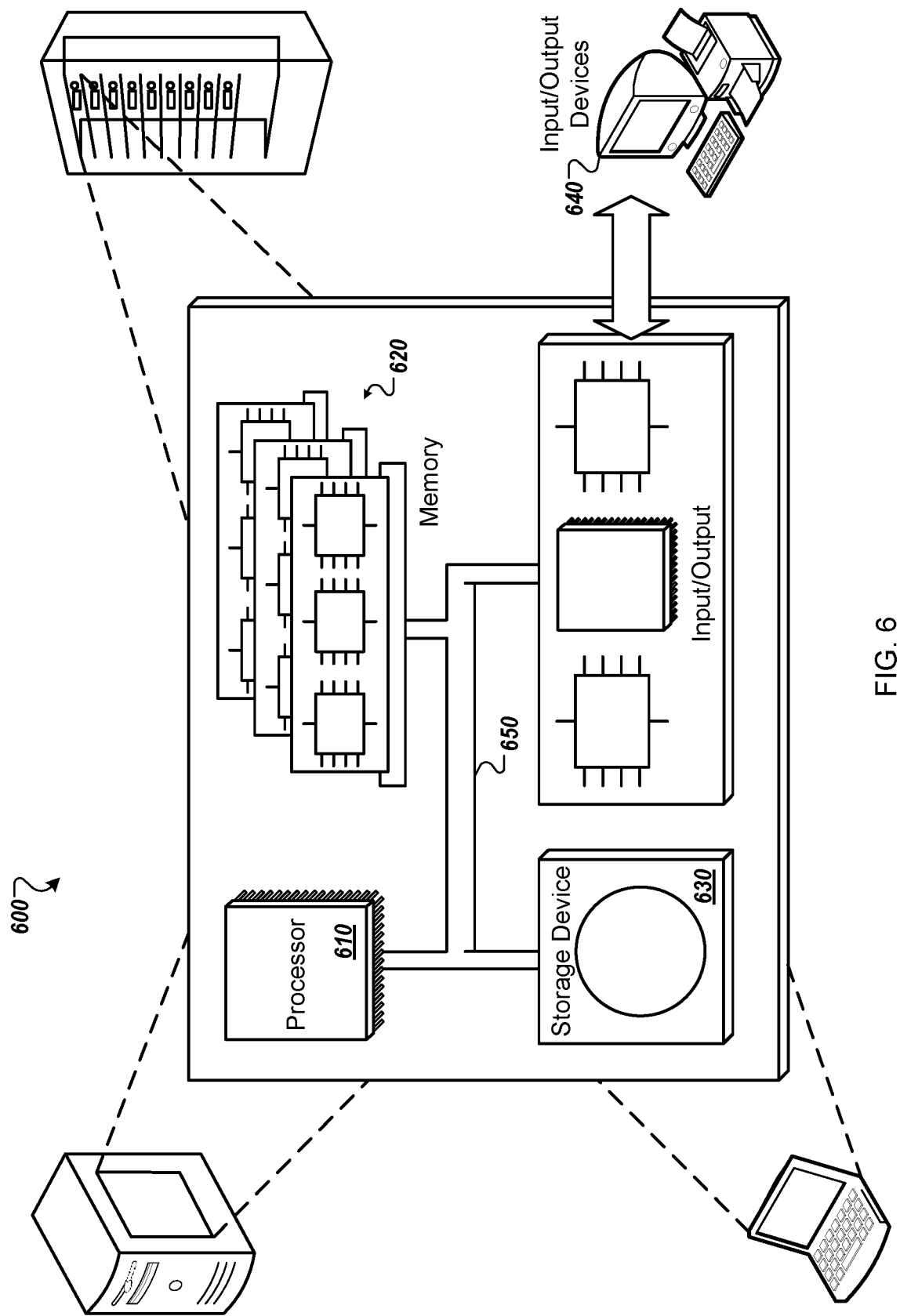
FIG. 6 is a block diagram of a computing system that can be used in connection with computer-implemented methods described in this document.

An example of one such type of computer is shown in FIG. 6, which shows a schematic diagram of a computer system 600. The system 600 can be used for the operations described in association with any of the computer-implemented methods described previously, according to some implementations. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In some implementations, the processor 610 is a single-threaded processor. In other implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a non-transitory computer-readable medium. In some implementations, the memory 620 is a volatile memory unit. In other implementations, the memory 620 is a non-volatile memory unit.

The storage device 630 is capable of providing mass storage for the system 600. In some implementations, the storage device 630 is a non-transitory computer-readable medium. In various different implementations, the storage device 630 may be a floppy disk device, a hard disk device, an optical disk device, a tape device, or a solid state memory device.

The input/output device 640 provides input/output operations for the system 600. In some implementations, the input/output device 640 includes a keyboard and/or pointing device. In other implementations, the input/output device 640 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving a three-dimensional model of a solid object for creation by a three-dimensional extrusion printer;
    determining a hollow shell for the three-dimensional model that includes a plurality of interior surfaces;
    determining, for each of the plurality of interior surfaces, an angle of the respective interior surface;
    determining, for each of the interior surfaces that have an angle that satisfies a threshold angle, an infill structure for an interior structure to be located inside a modified object and extending through each layer of the three-dimensional model up to the respective interior surface, wherein the modified object is the same type of object as the solid object with at least one aperture;
    skipping, for each of the interior surfaces that have an angle that does not satisfy the threshold angle, generation of any infill structure; and
    generating data that represents each of the determined infill structures for use by the three-dimensional extrusion printer with the three-dimensional model to create the modified object.

2. The method of claim 1, wherein receiving the three-dimensional model of the solid object to be created by the three-dimensional extrusion printer comprises receiving the three-dimensional model of the solid object to be created by a fused filament fabrication printer.

3. The method of claim 1, comprising:
    comparing, for each of the plurality of interior surfaces of the modified object, the angle of the respective interior surface with the threshold angle;
    determining, for each interior surface in a first subset of the interior surfaces, that the angle of the respective interior surface satisfies the threshold angle; and
    determining, for each interior surface in a second subset of the interior surfaces, that the angle of the respective interior surface does not satisfy the threshold angle, the second subset being a different, disjoint subset of the interior surfaces than the first subset, wherein:
        determining, for each of the interior surfaces that have an angle that satisfies the threshold angle, the infill structure for the interior structure to be located inside the modified object and extending through each layer of the three-dimensional model up to the respective interior surface comprises determining, for each of the interior surfaces in the first subset, the infill structure for the interior structure to be located inside the modified object and extending through each layer of the three-dimensional model up to the respective interior surface in response to determining that the angle of the respective interior surface satisfies the threshold angle; and
        skipping, for each of the interior surfaces that have an angle that does not satisfy the threshold angle, generation of any infill structure comprises skipping, for each of the interior surfaces in the second subset, generation of any infill structure in response to determining that the angle of the respective interior surface does not satisfy the threshold angle.

4. The method of claim 1, comprising:
    determining a configuration of the three-dimensional extrusion printer;
    determining a material that the three-dimensional extrusion printer will use to create the modified object; and
    determining the threshold angle using the configuration and a property of the material.

5. The method of claim 1, comprising:
    determining a material that the three-dimensional extrusion printer will use to create the modified object; and
    determining the threshold angle using a property of the material.

6. The method of claim 1, comprising:
    determining a configuration of the three-dimensional extrusion printer; and
    determining the threshold angle using the configuration.

7. The method of claim 1, comprising:
    generating a plurality of slices of the three-dimensional model that each identify one or more surfaces for the modified object represented by the respective slice in response to generating data that represents each of the determined infill structures for use by the three-dimensional extrusion printer with the three-dimensional model to create the modified object;
    generating, for each of the plurality of slices, tool path data that indicates a path for a tool-head included in the three-dimensional extrusion printer to create the one or more surfaces represented by the respective slice; and
    providing, for at least one of the plurality of slices, the tool path data to the three-dimensional extrusion printer.

8. A system comprising:
one or more computers; and
one or more storage devices coupled with the one or more computers and on which are stored instructions;
wherein the instructions stored on the one or more storage devices are configured to cause the one or more computers to: (i) receiving a three-dimensional model of a solid object for creation by a three-dimensional extrusion printer; iii) determine a hollow shell for the three-dimensional model that includes a plurality of interior surfaces; (iii) determine, for each of the plurality of interior surfaces, an angle of the respective interior surface; (iv) determine, for each of the interior surfaces that have an angle that satisfies a threshold angle, an infill structure for an interior structure to be located inside a modified object and extending through each layer of the three-dimensional model up to the respective interior surface, wherein the modified object is the same type of object as the solid object with at least one aperture; (v) skip, for each of the interior surfaces that have an angle that does not satisfy the threshold angle, generation of any infill structure; (vi) generate data that represents each of the determined infill structures; and (vii) provide the data that represents each of the determined infill structures to the three-dimensional extrusion printer for use by the three-dimensional extrusion printer with the three-dimensional model to create the modified object.

9. The system of claim 8, wherein the three-dimensional extrusion printer comprises a fused filament fabrication printer.

10. The system of claim 8, wherein the instructions stored on the one or more storage devices are configured to cause the one or more computers to:
compare, for each of the plurality of interior surfaces of the modified object, the angle of the respective interior surface with the threshold angle;
determine, for each interior surface in a first subset of the interior surfaces, that the angle of the respective interior surface satisfies the threshold angle; and
determine, for each interior surface in a second subset of the interior surfaces, that the angle of the respective interior surface does not satisfy the threshold angle, the second subset being a different, disjoint subset of the interior surfaces than the first subset;
determine, for each of the interior surfaces in the first subset, the infill structure for the interior structure to be located inside the modified object and extending through each layer of the three-dimensional model up to the respective interior surface in response to determining that the angle of the respective interior surface satisfies the threshold angle; and
skip, for each of the interior surfaces in the second subset, generation of any infill structure in response to determining that the angle of the respective interior surface does not satisfy the threshold angle.

11. The system of claim 8, wherein the instructions stored on the one or more storage devices are configured to cause the one or more computers to:
determine a configuration of the three-dimensional extrusion printer;
determine a material that the three-dimensional extrusion printer will use to create the modified object; and
determine the threshold angle using the configuration and a property of the material.

* * * * *

UNITED STATES PATENT AND TRADEMARK OFFICE
CERTIFICATE OF CORRECTION

PATENT NO. : 10,639,878 B2
APPLICATION NO. : 15/433213
DATED : May 5, 2020
INVENTOR(S) : Andreas Linas Bastian and Gregory David Meess It is certified that error appears in the above-identified patent and that said Letters Patent is hereby corrected as shown below:

In the Claims

Column 31, Line 7, in Claim 8: delete "receiving" and insert --receive--, therefor.

Column 31, Line 9, in Claim 8: delete "iii)" and insert --(ii)--, therefor.

Signed and Sealed this
Fourteenth Day of July, 2020

Andrei Iancu
*Director of the United States Patent and Trademark Office*